Aug. 5, 1924.
R. G. KILKENNY
1,504,056
MOTOR VEHICLE DRAFT APPLIANCE
Filed May 31, 1923
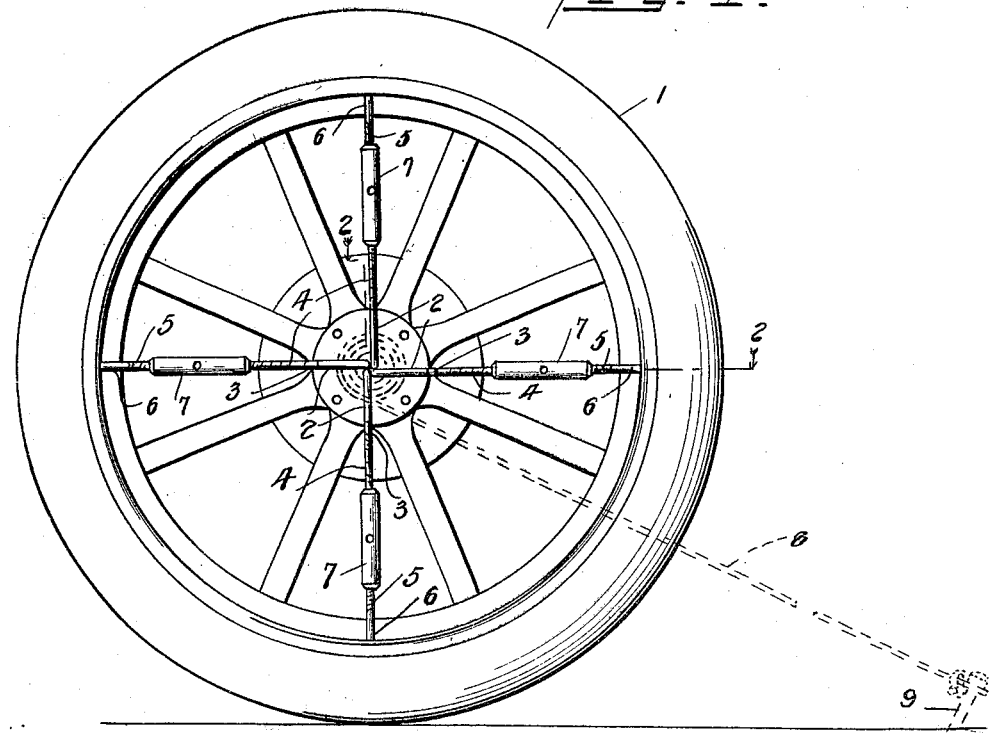
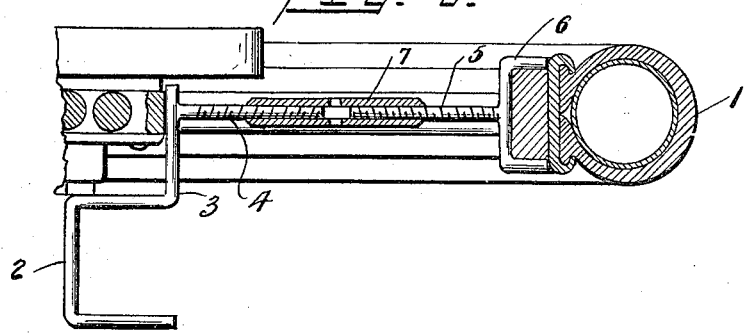
Inventor
R. G. Kilkenny.

Patented Aug. 5, 1924.

1,504,056

UNITED STATES PATENT OFFICE.

ROLLIN G. KILKENNY, OF CLEARMONT, WYOMING.

MOTOR-VEHICLE DRAFT APPLIANCE.

Application filed May 31, 1923. Serial No. 642,588.

*To all whom it may concern:*

Be it known that I, ROLLIN G. KILKENNY, a citizen of the United States, residing at Clearmont, in the county of Sheridan and State of Wyoming, have invented certain new and useful Improvements in Motor-Vehicle Draft Appliances; and I do hereby declare the following to be a full, clear, and exact description of the invention, such as will enable others skilled in the art to which it appertains to make and use the same.

The invention has for its object the provision of means whereby a stalled motor vehicle may utilize its motive plant as means for extracting the vehicle when stalled by reason of mud, sand or other soft place in the surface causing the wheel to sink and ordinarily requiring a team or other motor vehicle to move the stalled machine.

In accordance with the present invention, an attachment is provided which when applied to a drive wheel results in the formation of a drum upon the outer side thereof upon which may be wound a rope or cable which is anchored at one end to a peg driven into the ground, or which may be attached to a tree, post or other device adapted to secure the same.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view illustrative of the invention, and

Figure 2 is a sectional detail on the line 2—2 of Figure 1.

Corresponding and like parts are referred to in the following description and designated in the several views of the drawings by like reference characters.

The numeral 1 designates a rear wheel of a motor vehicle which ordinarily constitutes one of the drivers. The attachment when in position results in the provision of a drum upon the outer side of the wheel in line with the axle and attaching means for securing the drum to the wheel, said means being disposed between adjacent spokes and between the hub and the rim of the wheel.

The drum comprises a plurality of U-shaped members 2 adapted to be grouped about a prolongation of the axis of the wheel. Each U-shaped member 2 is provided with a shank 3 which is adapted to engage the hub of the wheel between adjacent spokes. The U-shaped members 2 are uniformly spaced about the hub of the wheel and the shank 3 of each is provided with a stem 4 which is arranged to extend outwardly. A companion stem 5 having a fork 6 at its outer end to embrace opposite sides of the rim of the wheel is connected with the stem 4 by means of a sleeve 7. One of the stems is provided with a right thread and the companion stem with a left thread, and the sleeve 7 has opposite end portions correspondingly threaded so that rotation of the sleeve in one direction moves the stems 4 and 5 outwardly so as to clamp the hub and rim of the wheel and rotation of the sleeve 7 in the opposite direction draws said stems inwardly whereby to release their grip upon the hub and rim of the wheel so that the device may be removed or placed in position as required. When the device is in position, the U-shaped members 2 form a drum upon which one end of a rope or cable 8 is adapted to be wound the opposite end of said rope or cable being anchored by means of a pin 9 or in any other convenient way, as by being attached to a tree, post or the like.

The device is of a nature to be carried as an accessory and may be easily and quickly placed in position when required for use and readily removed to be stowed away so as to be out of the way when not required for immediate service. The rope or cable 8 may be used as a pull line or for other purpose.

What is claimed is:

A motor vehicle draft appliance comprising U-shaped members adapted to form a drum and provided with shanks to engage the hub of a wheel between adjacent spokes, stems projecting outwardly from said shanks, complemental stems having forks at their outer ends to embrace opposite sides of the rim of a wheel, and a sleeve forming connecting means between companion stems and having a right thread engagement with one and a left thread engagement with the other.

In testimony whereof I affix my signature in presence of two witnesses.

ROLLIN G. KILKENNY.

Witnesses:
G. T. COOK,
H. R. ZINGG.